United States Patent
Schafheutle et al.

[11] Patent Number: 5,929,161
[45] Date of Patent: Jul. 27, 1999

[54] CATIONIC POLYURETHANE-BASED POLYMER DISPERSIONS

[75] Inventors: Markus A. Schafheutle, Graz, Austria; Achim Voelker, Offenbach, Germany; Susanne Wehner, Villmar, Germany; Klausjoerg Klein, Wuppertal, Germany

[73] Assignee: Vianova Resins GmbH, Mainz-Kastel, Germany

[21] Appl. No.: 08/849,535

[22] PCT Filed: Dec. 15, 1995

[86] PCT No.: PCT/EP95/04981

§ 371 Date: Jun. 23, 1997

§ 102(e) Date: Jun. 23, 1997

[87] PCT Pub. No.: WO96/20224

PCT Pub. Date: Jul. 4, 1996

[30] Foreign Application Priority Data

Dec. 23, 1994 [DE] Germany .......................... 44 46 439

[51] Int. Cl.$^6$ .................. C08J 3/00; C08K 3/20; C08L 75/00; C08F 8/30
[52] U.S. Cl. .................. 524/591; 427/372.2; 427/385.5; 524/507; 524/839; 524/840; 525/123; 525/455
[58] Field of Search ..................... 524/591, 839, 524/840, 507; 525/123, 455; 427/372.2, 385.5

[56] References Cited

U.S. PATENT DOCUMENTS

| | | |
|---|---|---|
| 3,169,945 | 2/1965 | Hostettler et al. . |
| 4,644,030 | 2/1987 | Loewrigkeit et al. ................. 524/457 |
| 4,683,285 | 7/1987 | Paar et al. ................. 528/113 |
| 4,788,246 | 11/1988 | Tsuchiya et al. ................. 524/554 |
| 4,806,611 | 2/1989 | Hönel et al. ................. 528/45 |
| 4,808,658 | 2/1989 | Walz et al. ................. 524/591 |
| 4,882,391 | 11/1989 | Brindöpke et al. ................. 525/327.2 |
| 4,904,727 | 2/1990 | Probst et al. ................. 524/820 |
| 4,918,129 | 4/1990 | Probst et al. ................. 524/457 |
| 5,176,804 | 1/1993 | Büttner et al. ................. 204/181.7 |
| 5,260,354 | 11/1993 | Kaylo et al. ................. 523/402 |
| 5,314,942 | 5/1994 | Coogan et al. ................. 524/457 |
| 5,589,049 | 12/1996 | Ott et al. ................. 204/504 |

FOREIGN PATENT DOCUMENTS

| | | |
|---|---|---|
| 0 183 025 | 6/1986 | European Pat. Off. . |
| 0 234 395 | 9/1987 | European Pat. Off. . |
| 0 249 884 | 12/1987 | European Pat. Off. . |
| 0 272 665 | 6/1988 | European Pat. Off. . |
| 0 274 721 | 7/1988 | European Pat. Off. . |
| 0 282 000 | 9/1988 | European Pat. Off. . |
| 0 334 032 | 9/1989 | European Pat. Off. . |
| 0 463 474 | 1/1992 | European Pat. Off. . |
| 37 18520 | 12/1988 | Germany . |
| 39 40 781 | 6/1991 | Germany . |
| 42 04 581 | 8/1993 | Germany . |
| 2 068 391 | 8/1981 | United Kingdom . |

OTHER PUBLICATIONS

Tsuchiya et al; "Corrosion protection at sharp edges"; European Coatings Journal; pp. 6,7,10–12.

*Primary Examiner*—Patrick D. Niland
*Attorney, Agent, or Firm*—Foley & Lardner

[57] ABSTRACT

Process for preparing aqueous dispersions by free-radically initiated emulsion polymerization of one or more vinyl monomers in water in the presence of a cationically stabilized polyurethane as emulsifier.

14 Claims, No Drawings

CATIONIC POLYURETHANE-BASED POLYMER DISPERSIONS

The invention relates to dispersions of cationically solubilized polyurethanes, to a process for their preparation and to their use as an additive in cationic electrodeposition coating materials.

GB-A 2 068 391 describes a process for preparing polymer latices, where aqueous emulsions of polymerizable monomers are polymerized in the presence of an amine salt of a polyurethane prepolymer. The polyurethane prepolymer is prepared in four stages by reacting a hydrophilic polyol with an excess of a polyisocyanate, blocking the isocyanate groups with a ketoxime, reacting the prepolymer, which is terminated with capped isocyanate groups, with a polyfunctional amine, and finally adding acid to form salts.

DE-A 37 18 520 describes the use of the emulsion polymers disclosed therein as paper sizing agents. Cationically modified polyurethanes are employed as emulsifier.

EP-A 0 334 032 describes a process for preparing dispersions of polymers by polymerization of olefinically unsaturated monomers in water in the presence of oligourethanes having a branched molecular structure and hydrophilic groups which, exclusively or predominantly, have been incorporated terminally in the oligourethane. The dispersions are used as coating compositions.

The technique of electrodeposition coating has been found advantageous in connection with the coating of metal panels. In connection with the coating of edges, especially sharp edges, however, only low coat thicknesses can be obtained. Although increasing the pigment concentration improves coating in the vicinity of edges, this is at the cost of an increase in surface roughness. Substantially increasing the pigmentation is undesirable on economic grounds as well. The presence of microgels in the binder also improves the coating of edges. Such techniques are described in, for example, US-A 4,788,246, EP-A 0 463 474, EP-A 0 282 000 and DE-A 42 04 581.

The preparation of these microgel-containing binders requires additional reaction stages. The microgel particles must be to a large degree chemically similar to the binder in order to avoid separation. The difference in density between microgel and the bath liquid must not be too large, so as to prevent sedimentation.

Microgel particles having a core-shell structure have been proposed (European Coatings Journal, (1), p. 6ff, 1991). Ionic, preferably cationic, groups in the material of the shell improve the hydrophilicity and the stability of the deposition bath containing microgel particles. These microgel particles are prepared by adding water to a resin mixture to form a dispersion in water of particles having a core-shell structure. In this system, one of the resins of the mixture forms the shell, the other the core. These primary particles are crosslinked by heating at from 80 to 90° C. for a period of from 1 to 7 hours. The crosslinked dispersion is added to the deposition bath. In this process, the two resins must first of all form a homogeneous mixture, and following the addition of water the difference in hydrophilicity must lead to formation of a core-shell structure. As a consequence, there are limitations on the combination of materials.

An alternative solution is described in EP-A 0 249 884: a mixture of capped isocyanates is employed as hardener, the dissociation temperature of one isocyanate component being between 60 and 120° C. and that of the second component being 40° C. higher. The blocked isocyanate that dissociates at the lower temperature provides early thickening of the binder and prevents it flowing away from the edge. Because of the heightened reactivity of one isocyanate component, these binders have a tendency to form sediments in the bath as a result of premature setting, thereby adversely affecting the useful life of the bath. The edge protection effect is dependent on the particular amounts of isocyanates in the bath liquid and cannot be varied in a closely controlled manner.

The object of the invention therefore, is to improve the edge protection afforded in cationic electrodeposition coating without the disadvantages of the prior art solutions. A further object was to achieve this improvement by means of an additive that can be added to an otherwise coating-ready bath in an amount adapted to the particular intended application and which is highly compatible with the bath liquids which are commonly used. It has surprisingly been revealed that a dispersion of vinyl polymers with a cationic polyurethane as emulsifier is compatible with all of the bath liquids which are commonly used. As an additive in cationic deposition baths, this dispersion, especially in its crosslinked state (microgel dispersion), provides considerably improved edge protection on deposition coating. It has also been found that this dispersion, in its uncrosslinked state, is outstandingly suitable as a binder for printing inks as well, since because of their low emulsifier content they dry rapidly and lend themselves readily to cationic deinking.

The invention provides for the use of an aqueous dispersion, in particular of microgel particles, obtainable by free-radically initiated emulsion polymerization of one or more vinyl monomers in water in the presence of an emulsifier based on cationically solubilized polyurethanes as an additive in electrodeposition baths.

The invention also provides a process for coating electrically conductive substrates by the electrodeposition technique, where the substrate is connected as cathode and in the bath liquid an addition of from 0.1 to 10% of the dispersion as claimed in claim 1 is used.

The invention also provides for the use of the novel microgel particle dispersions as an additive in electrodeposition baths for improving the edge protection afforded on electrodeposition coating.

The invention relates also to a process for coating electrically conductive substrates in which the substrate is immersed into an aqueous electrodeposition bath comprising at least cathodically depositable synthetic resin, the substrate is connected as cathode, a film is deposited on the substrate by means of direct current, the substrate is removed from the bath and the deposited coating film is baked. The process is one wherein the aqueous electrodeposition bath comprises a microgel particle dispersion as defined at the outset.

The invention also provides for the use of the novel dispersions, in their uncrosslinked state, as binders in printing inks.

The novel dispersions typically have a particle mass content of from 10 to 60%, preferably from 20 to 50%, measured as dry residue after drying for 2 hours at 120° C., and a particle size distribution which is such that 90% of the number of particles have a diameter of between 5 and 500 nm, preferably from 10 to 400 nm and, with particular preference, from 30 to 300 nm.

Monomers suitable for the invention are aliphatic vinyl monomers, such as vinyl esters of aliphatic carboxylic acids having 1 to 18 carbon atoms in the acid residue, vinyl ethers and vinyl ketones having in each case 1 to 8 carbon atoms in the alkyl radical, vinyl halides and vinylidene halides, alkyl esters having 1 to 18 carbon atoms in the alkyl radical and hydroxyalkyl esters having 2 to 10 carbon atoms in the alkyl radical with α,β-olefinically unsaturated carboxylic acids, the corresponding acids and their amides, which if desired may also carry alkyl substituents; and, furthermore, aromatic vinyl monomers, such as styrene, vinyltoluene and vinylnaphthalene. Preference is given to vinyl esters of aliphatic carboxylic acids having 2 to 6 carbon atoms in the acid residue, alkyl esters having 1 to 8 carbon atoms in the alkyl radical and hydroxyalkyl esters having 2 to 10 carbon atoms in the alkyl radical with acrylic and methacrylic acid, and styrene. To prepare uncross- linked dispersions, use is made of vinyl monomers which are monoolefinically saturated. Addition of polyolefinically unsaturated compounds to the monomer mixture leads to dispersions which are crosslinked and form microgel particles. Preference is given to divinyl monomers such as divinylbenzene, butenediol diacrylate, glycol divinyl ether, divinyl adipate, allyl vinyl ether and triunsaturated compounds such as triallyl cyanurate and diallyl fumarate. The molar proportion of polyunsaturated compounds in this context can be up to 15%, preferably from 0.001 to 10%, and, with particular preference, from 0.01 to 5%, based on the sum of the molar amounts of olefinically unsaturated monomers.

The polymerization of the vinyl monomers is initiated by free-radical initiators. As initiator component it is possible in accordance with the invention to use organic azo compounds, preferably aliphatic azo compounds, and, with particular preference, azobisalkanes. Likewise suitable are peroxo compounds, such as peroxides, for example hydrogen peroxide, salts of peroxo acids, such as persulfates and percarbonates, organic peroxo compounds, such as alkyl hydroperoxides, diacyl peroxides and organic peroxo acids. As initiator component it is preferred to employ these peroxo compounds in combination with reducing agents, for example sulfites and hyposulfites, hydroxylamine, Rongalit and enolizable carbonyl compounds, such as ascorbic acid. The addition of salts of transition metals such as iron, copper or cerium has an accelerating effect.

Emulsifiers employed are cationic polyurethanes, in amounts of from 5 to 50%, preferably from 10 to 30%, based on the mass of vinyl monomers. They are obtainable by reacting an isocyanate component, consisting of at least one difunctional or higher polyfunctional isocyanate B, a polyol component, consisting of at least one organic compound A having two or more hydroxyl groups, and at least one organic compound C, which contains at least one tertiary amino group and also at least one isocyanate-reactive group selected from hydroxyl, mercapto and primary and secondary amino groups.

The polyhydroxy compounds A are selected, for example, from the polyhydroxypolyethers A1, the polyhydroxypolyesters A2, the polyhydroxypolyesteramides A3, the polyhydroxypolycarbonates A4 and the polyhydroxypolyolefins A5. If desired, the addition is made to the compounds A of low molecular mass glycols, for example glycol itself, di- or triethylene glycol, 1,2- or 1,3-propanediol, 1,4-butanediol, neopentylglycol, 1,6-hexanediol, cyclohexanedimethanol or 2,2-bis (4'hydroxycyclohexyl)propane and also polyhydric alcohols, such as trishydroxyalkylalkanes (e.g. trimethylolpropane) or tetrakishydroxyalkylalkanes (e.g. pentaerythritol). These polyhydroxy compounds can be employed either individually or in a mixture. Preference is given to polyhydroxypolyethers and polyhydroxypolyesters.

The polyhydroxypolyethers A1 can, for example, be polyetherdiols of the formula

in which R is a hydrogen radical or an alkyl radical having up to 6 C atoms, with or without further substituents, n is an integer from 2 to 6 and m is an integer from 10 to 120. Examples are polyethylene glycols, polypropylene glycols, copolymers thereof, and polytetramethylene glycols. Preference is given to polypropylene glycols having a molar mass of from 400 to 5000 g/mol. Other suitable polyhydroxypolyethers are branched polyhydroxypolyethers of the structure

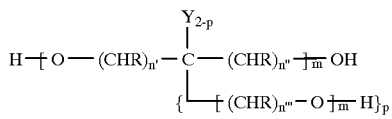

where n, n', n'', n'''=1 . . . 6 m=10 . . . 120 p=0, 1, 2

Y=H, alkyl which are obtained, for example, by reacting trihydric or higher polyhydric alcohols, such as glycerol, trimethylolpropane and pentaerythritol, with epoxides, such as ethylene oxide and/or propylene oxide. Preference is given to oligomers and polymers derived from ethylene oxide and propylene oxide.

The polyhydroxypolyesters A2 are prepared by esterifying polycarboxylic acids or their anhydrides with organic polyhydroxy compounds. The polycarboxylic acids and the polyhydroxy compounds can be aliphatic, aromatic or mixed aliphatic/aromatic. Suitable polyhydroxy compounds are alkylene glycols, such as glycol, 1,2- and 1,3-propanediol, 1,4-butanediol, neopentylglycol, 1,6-hexanediol, cyclohexanedimethanol and 2,2-bis(4'-hydroxycyclohexyl)-propane and also polyhydric alcohols such as trishydroxyalkylalkanes (e.g. trimethylolpropane) or tetrakishydroxyalkylalkanes (e.g. pentaerythritol). Examples of suitable polycarboxylic acids having 2 to 18 carbon atoms in the molecule are phthalic acid, isophthalic acid, terephthalic acid, tetrahydrophthalic acid, hexahydrophthalic acid, succinic acid, adipic acid, azelaic acid, sebacic acid, maleic acid, glutaric acid, hexachloroheptanedicarboxylic acid, tetrachlorophthalic acid, trimellitic acid and pyromellitic acid. Instead of these acids it is also possible to use their anhydrides, provided they exist. As polycarboxylic acids it is also possible to employ dimeric and trimeric fatty acids. Preference is given to polyesters of alkylene glycols having 2 to 4 carbon atoms and aliphatic dicarboxylic acids, preferably adipic acid.

Other suitable polyhydroxypolyesters are derived from polylactones, obtainable for example by reacting ε-caprolactone with polyols. Such products are described in, for example, US-A 3,169,945. The polylactonepolyols obtained by this reaction are notable for the presence of a terminal hydroxyl groups and for repeating polyester units derived from the lactone. These repeating molecular units can be of the formula

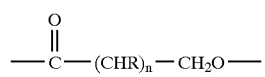

in which n is preferably from 4 to 6 and the substituent R is hydrogen, an alkyl radical, a cycloalkyl radical or an alkoxy radical, no substituent containing more than 12 carbon atoms and the overall number of carbon atoms of the substituent in the lactone ring not exceeding 12.

The lactone used as starting material can be any desired lactone or any desired combination of lactones, it being intended that this lactone should contain at least 6 carbon atoms in the ring, for example 6 to 8 carbon atoms, and that at least 2 hydrogen substituents should be present on the carbon atom attached to the oxygen group of the ring. The lactone used as starting material can be represented by the following formula:

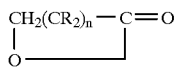

in which n and R are as already defined.

The lactones preferred in connection with the invention are the ε-caprolactones, in which n is 4. The most preferred lactone is unsubstituted ε-caprolactone, where n is 4 and all substituents R are hydrogen. This lactone is particularly preferred since it is available in large amounts and gives binders having excellent properties. Morover, various other lactones can be used individually or in combination.

Examples of aliphatic polyols suitable for the reaction with the lactone are ethylene glycol, 1,3-propanediol, 1,4-butanediol, 1,6-hexanediol, dimethylolcyclohexane, trimethylolpropane and pentaerythritol.

The polyhydroxypolyesteramides A3 are derived, for example, from polycarboxylic acids and amino alcohols in a mixture with polyhydroxy compounds. Suitable polycarboxylic acids and polyhydroxy compounds have been described under A2; examples of suitable amino alcohols are ethanolamine and monoisopropanolamine.

The polyhydroxypolycarbonates A4 are preferably polycarbonatediols of the formula

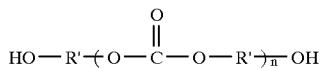

in which R' is an alkylene radical. These OH functional polycarbonates can be prepared by reacting polyols, such as 1,3-propanediol, 1,4-butanediol, 1,6-hexanediol, diethylene glycol triethylene glycol, 1,4-bishydroxymethylcyclohexane, 2,2-bis(4'-hydroxycyclohexyl)propane, neopentylglycol, trimethylolpropane and pentaerythritol, with dicarbonates, such as dimethyl, diethyl or diphenyl carbonate, or with phosgene. Mixtures of such polyols can likewise be employed.

The polyhydroxypolyolefins A5 are derived, for example, from oligomeric and polymeric olefins having at least two terminal hydroxyl groups; alpha, omega-dihydroxypolybutadiene is to be mentioned as preferred.

Further, likewise suitable polyhydroxy compounds are polyacetals, polysiloxanes and alkyd resins.

The polyfunctional isocyanates B are those customarily used in polyurethane chemistry. Examples of suitable isocyanates are the aliphatic diisocyanates trimethylene diisocyanate, tetramethylene diisocyanate, pentamethylene diisocyanate, hexamethylene diisocyanate (HDI), 1,5-diisocyanato-2-methylpentane, 1,12-diisocyanatododecane, propylene diisocyanate, ethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4phenylene diisocyanate, 2,4- and 2,6-tolylene diisocyanate (TDI), 4,4'-biphenylene diisocyanate, 4,4'-diphenylmethane diisocyanate (MDI), 1,5-naphthylene diisocyanate, 1,4-naphthylene diisocyanate, 1-isocyanatomethyl-5-isocyanato-1,3,3-trimethylcyclohexane (IPDI), bis(4-isocyanatocyclohexyl)methane, 2,2-bis(4'-isocyanatocyclohexyl)propane, 4,4'-diisocyanatodiphenyl ether, 2,3-bis(8-isocyanatooctyl)-4-octyl-5-hexylcyclohexene, tetramethylxylylene diisocyanate (TMXDI), isocyanurates of the above diisocyanates, and also allophanates of the above diisocyanates. Mixtures of such isocyanates can likewise be employed. Preference is given to the aliphatic isocyanates IPDI and HDI, and also to TMXDI, TDI and MDI and its polycyclic oligomers.

The compounds C have at least one isocyanate-reactive group and at least one cationic or cationogenic group. The cationic or cationogenic group is preferably derived from tertiary amino groups. The isocyanate-reactive groups are selected from hydroxyl groups, primary and secondary amino groups and mercapto groups. These groups may also be present in a mixture in the compounds according to C, provided the number of isocyanate-reactive groups is two or more. Preferred compounds C are polyamines having at least one tertiary and at least one primary or secondary amino group, compounds having at least one tertiary amino group and at least one hydroxyl and/or mercapto group. Dimethylaminopropylamine is particularly preferred.

The amounts of components A, B and C are chosen such that the resulting cationic polyurethane has an amine number of from 5 to 40, preferably from 10 to 30 and, with particular preference, from approximately 17 to 25 mg/g (based on the solid resin).

The novel aqueous dispersions are preferably prepared by adding in a first step a proportion of in each case from 5 to 20% of the initiator component and of the vinyl monomer component to the aqueous dispersion of the cationically stabilized polyurethane at a temperature of between 60 and 98° C., preferably from 70 to 95° C., and, after an initial reaction time of from 2 to 20 minutes, metering in the remaining amount of from 80 to 95% of the initiator and of the vinylmonomer component. The second metered addition takes place at a uniform rate over a period of from 60 to 240 minutes. In another preferred embodiment of the novel process, from 10 to 60 minutes after the end of the second metered addition, a further amount of the initiator component is added over a period of from 2 to 20 minutes. As a proportion of the overall amount of initiator component, the third addition amounts to between 2 and 20%. The dispersion is subsequently held at the reaction temperature for from 60 to 240 minutes and then filtered.

By replacing a fraction of from 1 to 50%, preferably from 2 to 20%, of the molar amount of monounsaturated vinyl monomers by diunsaturated or higher polyunsaturated vinyl monomers, crosslinked dispersions are obtained in the novel process. Depending on the proportion of polyunsaturated vinyl monomers there is a resulting low or high crosslinking density and thus a low or high hardness of the dispersed particles.

The novel microgel dispersions can be used as an additive in electrodeposition baths. They are usually added in an amount of from 0.1 to 10%, preferably from 0.5 to 5%, and, with particular preference, from 1 to 3%, calculated as solid resin based on the mass of the bath liquid. The addition of the novel microgel dispersions to a customary cataphoresis bath containing cathodically depositable binders brings about an improvement in the uniformity of the coat thickness in the vicinity of sharp edges for a given deposition voltage and deposition time relative to an otherwise identical bath without this addition.

The novel electrodeposition baths include all of the customary binders, crosslinkers, pigments, catalysts and additives. Examples of suitable binders are autocross-linking or, preferably, externally crosslinking, cationic, amine-modified epoxy resins.

The term cationic, amine-modified epoxy resins refers to cationic reaction products of modified or unmodified polyepoxides, primary and/or secondary amines and/or their salts and/or salts of tertiary amines and, if desired, polyols, polycarboxylic acids, polyamines or polysulfides.

Other suitable binders are cationic amino urethane resins, as described in EP-A 0 274 721, EP-A 0 272 665 and EP-A 234 395.

Where these binders are not autocrosslinking, phenolic resins, polyfunctional Mannich bases, melamine resins, benzoguanamine resins or block polyisocyanates are employed as crosslinking agents.

The preparation of pigment pastes is general knowledge (cf. D. H. Parker, Principles of Surface Coating Technology, Interscience Publishers, New York (1965); R. L. Yates, Electropainting, Robert Draper Ltd., Teddington/England (1966); H. F. Payne, Organic Coating Technology, Volume 2, Wiley and Sons, New York (1961)). The pigment pastes can in prinicple comprise all pigments suitable for electrodeposition coating materials. In general, titanium dioxide is the only, or the predominant, white pigment. Other white pigments or extenders, such as antimony oxide, zinc oxide, basic lead carbonate, basic lead sulfate, barium carbonate, porcelain, clay, calcium carbonate, aluminum silicate, silica, magnesium carbonate, magnesium silicate, however, can also be used. As colored pigments it is possible, for example, to use cadmium yellow, quinacridone red, carbon black, phthalocyanine blue, chromium yellow, toluidyl red and hydrated iron oxide.

In addition to the pigments, the pigment paste may also comprise plasticizers, fillers, wetting agents, etc.

The pigment paste is added to the aqueous dispersion of the cathodically depositable synthetic resin in an amount such that the coating-ready electrodeposition bath has the properties required for deposition. In the majority of cases the mass ratio of pigment to cathodically depositable synthetic resin is from 0.05 to 0.5.

The novel microgel dispersion is added at the preparation stage of the coating material.

In addition to the cathodically depositable synthetic resin, the pigment paste and the novel microgel particle dispersion, the novel electrodeposition baths may also include other customary additives, examples being additional solvents, antioxidants, surfactants, etc.

The solids content of the novel electrodeposition baths is preferably from 7 to 35%, particularly preferably from 12 to 25%. The pH of the electrodeposition baths is between 4 and 8, preferably between 5 and 7.5.

The novel electrodeposition baths can be used for coating any desired electrically conducting substrates, but especially for coating metals, such as steel, aluminum, copper and the like. The steel can be zinc-plated, phosphatized or nonphosphatized.

The electrodeposition bath is brought into contact with an electrically conducting anode and with the electrically conductive substrate which is connected as cathode. On passage of electrical current between anode and cathode, a firmly adhering coating film is deposited on the cathode.

The temperature of the electrodeposition bath should be between 15 and 40° C., preferably between 25 and 35° C.

The applied voltage can vary within a large range and can, for example, be between 2 and 1000 V. Typically, however, voltages of between 50 and 500 V are operated. The current density is generally between about 10 and 3000 A/M$^2$, and falls away in the course of deposition.

After deposition, the coated article is rinsed off and is ready for baking.

The deposited coating films are generally baked at temperatures from 130 to 200° C. for a period of 10 to 60 minutes, preferably at 150 to 180° C. for a period of 15 to 30 minutes.

A further novel use of the dispersions in the uncrosslinked state is as a component of cationically deinkable printing inks. It has surprisingly been found that printing inks which comprise the novel dispersions dry more rapidly than printing inks with the known binders.

The invention is illustrated by the following examples.

All percentages and parts by weight are by mass, and figures in % are to be read such that their sum is 100%.

EXAMPLES

Example 1

Emulsifier 2 mol of diethylene glycol monobutyl ether, 5.66 mol of butylglycol and 1.13 mol of trimethylolpropane are introduced as initial charge, and at 80° C. 5.89 mol of ®Desmodur VL are metered in over 4 hours. After an NCO value of 2.6% has been reached, 0.75 mol of N,N-dimethylaminopropylamine is added. During this addition, the temperature of the material rises to about 110° C. After cooling to 95° C., 0.6 mol of formic acid as a 50% strength aqueous solution is added and is incorporated by stirring. The mixture is subsequently dispersed with deionized water and adjusted to a solids content of 55%.

Example 2

Dispersion 524 g of a 55% dispersion of the cationic polyurethane from Example 1 and 975.6 g of deionized water are introduced as initial charge. This mixture is heated to 90° C., and then in each case 10% of a solution of a) 6.6 g of 80% tert-butyl hydroperoxide in 100 g of deionized water, b) 10.4 g of ascorbic acid in 100 g of deionized water and c) a mixture of 651.6 g of styrene, 20.4 g of hydroxyethyl methacrylate, 28.8 g of dodecanethiol and 55.4 g of isooctyl butyrate are added. The addition is stopped and the reaction mixture is stirred at 90±2° C. for 10 minutes. After this holding phase, the remainder of each of the solutions is metered in at a uniform rate in parallel to the reaction mixture over 90 minutes and at 90±2° C. 30 minutes after the end of the metered addition, a solution of 0.6 g of 80% tert-butyl hydroperoxide and 1 g of ascorbic acid in 100 g of deionized water is added over 5 minutes. The dispersion is held at 90° C. for 2 h more and, after cooling, is filtered. A fine dispersion with a solids content of 40%, an acid content of 20.7 mmol/100 g, based on solids, and a pH of 4.8 is obtained.

Example 3

Crosslinked Dispersion

To a dispersion of 545.5 g of a 55% dispersion of the cationic polyurethane from Example 1 and 954.6 g of deionized water there are added in each case 10% of the solutions of a) 6.7 g of 80% tert-butyl hydroperoxide in water and 100 g of deionized water, b) 11 g of ascorbic acid in 100 g of deionized water and c) 54.5 g of divinylbenzene and 627.1 g of styrene at 90±2° C. After 10 minutes' pause, the remaining 90% of the respective solutions is metered in at a uniform rate and in parallel over 90 minutes at 90±2° C. 30 minutes after the end of the metered addition, a solution of 0.7 g of 80% tertbutyl hydroperoxide and 1.1 g of ascorbic acid in 100 g of deionized water is added over 5 minutes. The dispersion is then held at 90° C. for 2 h more and, after cooling, is filtered. A fine microgel dispersion which cannot be dissolved to give a clear solution in organic solvents and has a solids content of 40%, a pH of 4.5 and an acid content of 21 mmol/100 g, based on solids, is obtained.

Example 4
Preparing the Pigment Paste

In a manner similar to that of DE 39 40 781 (Example 5), a catalyst paste comprising dibutyltin oxide is prepared:

4.1 Epoxy-amine Adduct 1708 parts (4 mol) of Denacol® EX-145 (phenol-(EO5) glycidyl ether) are added over the course of one hour and from 60 to 80° C. to a solution of 204 parts (2 mol) of N,N-dimethylaminopropylamine in 1224 parts of ethoxypropanol. The mixture is subsequently held at from 80 to 100° C. until the epoxide content has fallen below the detection limit (amine number based on solids about 117 mg/g; solids content of about 50%).

4.2 Urethane 540 parts of isooctadecyl alcohol and 0.9 part of dibutyltin dilaurate are added over the course of one hour at from 40 to 60° C. to 348 parts of Desmodur® T80 (mixture of 80% 2,4- and 20% 2,6-tolylene diisocyanate) in 296 parts of xylene. The mixture is held at this temperature until the mass content of free isocyanate has fallen to about 9.5 (solids content about 75%).

4.3 Epoxy Urethane 1280 parts (2 mol of epoxide) of Beckopoxe ® SEP 311 (75% strength in xylene) are heated to 80° C. 1184 parts of urethane (Example 4.2, 75% strength) are added to this solution over the course of one hour. The mixture is held at 80° C. until free isocyanate can no longer be detected. The solvent is subsequently distilled off under reduced pressure, and the residue is diluted with 1232 parts of ethoxypropanol to a solids content of about 60%.

4.4 Binder

The solution obtained in 4.1 is introduced into the solution from 4.3, and the mixture is held at from 60 to 80° C. until the acid number and the epoxide content have fallen virtually to zero. The mixture is diluted with butylglycol to a solids content of 55%.

4.5 Grinding resin (Example 3 of EP-A 0 183 025)

In a reaction vessel provided with stirrer, thermometer, addition funnel, reflux condenser and water separator, 380 parts of an epoxy resin based on bisphenol A (molar mass divided by the mean number of epoxide groups per molecule "epoxide equivalent" about 190 g/mol) are reacted with 268 parts of tallow fatty amine and 104 parts of N,N-diethylaminopropylamine at from 75 to 80° C. until the epoxide content has fallen to zero. After cooling to 80° C., 60 parts of paraformaldehyde (91% strength) are added, and 38 parts of water of reaction are distilled off azeotropically with toluene as entrainer. The entrainer is distilled off under reduced pressure and the residue is taken up in 90 parts of 2-methoxypropanol. The resin has the following characteristics:

| Viscosity at 25° C.: | 7000 mPa · s |
| Amine number | 188 mg/g |
| Mass proportion of aliphatic structures | 33% |
| Molar mass (calculated) | 774 g/mol |
| Solids content | 55% |

4.6 Catalyst Paste (Example 5 of DE-A 39 40 781)

30 g of 2-ethoxypropanol, 3 g of a commercial wetting agent, 2 g of glacial acetic acid and 40 g of dibutyltin oxide are mixed in a dissolver and the mixture is dispersed at 60° C. for 2 hours. 60 g of the grinding resin from 4.5 and 64 g of deionized water are added, and the mixture is ground in a mill to the required particle size.

4.7 Paste Resin 10.6 parts of the binder from Example 4.4, 0.6 parts of acetic acid (50% strength), 0.6 parts of 2,4,7,9-tetramethyl-5-decyne-4,7-diol (Surfynol 104®, wetting agent) and 12.3 parts of the catalyst paste from Example 4.6 are mixed with one another. 4.0 parts of lead silicate, 0.4 parts of carbon black and 40.2 parts of titanium dioxide are added with stirring. An appropriate viscosity is established using 31.3 parts of deionized water, and the pigment paste is milled in an appropriate mill to an adequate particle size.

Example 5
Amino-epoxy Resin

In a reaction vessel fitted with stirrer, thermometer, dropping funnel and reflux condenser, 52.6 g of ®Texanol and 42 g of diethanolamine are metered at 40° C. into a solution of 566.4 g of polyglycidyl ether based on bisphenol A, having an epoxide equivalent weight of 472 g/mol, in 322 g of methoxypropanol. Subsequently, 20.4 g of dimethylaminopropylamine and 123.2 g of an adduct of 116 g of 1,6-diaminohexane with 500 g of Cardura® E10 (glycidyl ester of an a-branched monocarboxylic acid having 9 to 11 C atoms) are added at from 40 to 50° C. and the solution is slowly heated to 90 to 100° C. To complete the reaction, the temperature indicated is maintained for 3 hours more. The epoxide content is then zero.

Amine number: 98 (mg KOH/g of solid resin)

Solids content: 70% by mass

Example 6
Binder Comprising Resin and Hardener

The amino-epoxy resin of Example 5, heated to 90 to 100° C., is charged to a reaction vessel fitted with stirrer, thermometer, dropping funnel and reflux con- denser and is subjected to a vacuum distillation. As soon as the entire amount of solvent has been stripped off, the batch is cooled to 90 to 95° C. This mixture is neutralized with 11 g of 85% strength formic acid. For 7 parts of solid of this binder dispersion, 3 parts of solid of the hardener from Example 1 are added, and the mixture is held at from 60 to 80° C. until the acid number and epoxide content have fallen virtually to zero. Subsequently, demineralized water is mixed in until the solids content is 40% by mass.

Example 7
Paint Preparation 300 parts of binder dispersion (40% strength) according to Example 6 are diluted with 180 parts of deionized water and with stirring to a solids content of about 25%. 109 parts of pigment paste according to Example 4.7 and 1.2 parts of 50% strength formic acid are added to this clearcoat solution. A solids content of about 18% is established subsequently with deionized water. The pigment/binder ratio is about 0.4:1.

Example 8
Deposition/Deposition Results

The paint formulations are subjected to cataphoretic deposition in an open glass vessel. Zinc-coated substrates are used as cathode and a bright steel panel, at a distance of from 5 to 10 cm from the cathode, is used as anode. The bath temperature is 28° C., and the duration of deposition is 2 minutes. Stirring is carried out using a PTFE-coated magnetic stirrer rod.

To the paint formulation there are added 1% and 3% of solid resin, respectively, of the novel additive I (according to Example 2) and of additive II (according to Example 3), based on the mass of the bath liquid.

The film thicknesses obtained in each case and the surface quality of the deposited and subsequently cured films (baking conditions 20 min, oven temperature of 165° C.) and also the testing of edge protection on perforated panels after salt spray exposure (Herberts GmbH; Testing of edge protection in electrodeposition coating) are shown in the table below.

| | 0-sample | Addition of additive I 1% | Addition of additive I 3% | Addition of additive II 1% | Addition of additive II 3% |
|---|---|---|---|---|---|
| Film thickness in μm | 20 | 20 | 20 | 20 | 20 |
| Ra in μm | 0.28 | 0.30 | 0.45 | 0.28 | 0.55 |
| Edge protection | n.s. | a.s. | s. | a.s. | s. | n.s. not satisfactory
a.s. almost satisfactory
s. satisfactory
Ra mean peak-to-valley distance

We claim:

1. A cationically depositable electrodeposition bath comprising a cathodically depositable binder, and an aqueous dispersion prepared by free-radically initiated emulsion polymerization, in water in the presence of a cationically stabilized polyurethane emulsifier, of (i) one or more vinyl monomers and (ii) a molar proportion of from 0.001 to 15%, based on the sum of molar amounts of olefinically unsaturated monomers of one or more polyolefinically unsaturated monomers selected from the group consisting of divinyl benzene, butanediol diacrylate, glycol divinyl ether, divinyl adipate, allyl vinyl ether, triallyl cyanurate, and diallyl fumarate.

2. A cationically depositable electrodeposition bath as claimed in claim 1, where the cationically stabilized polyurethane is obtained by reacting (i) an isocyanate component comprising at least one difunctional or higher polyfunctional isocyanate, (ii) a polyol component comprising at least one organic compound having two or more hydroxyl groups, and (iii) at least one organic compound which comprises at least one tertiary amino group and at least one isocyanate-reactive group selected from one or more of hydroxyl, mercapto, primary amino, and secondary amino groups.

3. A cationically depositable electrodeposition bath as claimed in claim 1, wherein the vinyl monomers are selected from one or more of a vinyl ester of an aliphatic carboxylic acid having 2 to 6 carbon atoms in the acid residue, an alkyl ester having 1 to 8 carbon atoms, a hydroxyalkyl ester having 2 to 10 carbon atoms with acrylic and methacrylic acid, and styrene.

4. A cationically depositable electrodeposition bath as claimed in claim 1, wherein a redox system comprising a peroxide and a reducing agent is employed as an initiator for the polymerization.

5. A cationically depositable electrodeposition bath as claimed in claim 4, wherein a salt of a transition metal is employed as an accelerator for the polymerization.

6. A cationically depositable electrodeposition bath as claimed in claim 1, wherein the cationically stabilised polyurethane is employed in an amount of from 5 to 50%, based on the mass of vinyl monomers.

7. A cationically depositable electrodeposition bath as claimed in claim 1, wherein the polymerization comprises in a first step adding a proportion of from 5 to 20% of an initiator component and from 5 to 20% of the vinyl monomer component to an aqueous dispersion of the cationically stabilized polyurethane and, after an initial reaction time of from 2 to 20 minutes, in a second addition metering in the remaining amounts of the initiator and of the vinyl monomer component.

8. A cationically depositable electrodeposition bath as claimed in claim 7, wherein from 10 to 60 minutes after the end of the second addition, a further amount of the initiator component is added which as a proportion of the overall amount of initiator component amounts to between 2 and 20%.

9. A cationically depositable electrodeposition bath as claimed in claim 1, wherein 0.01 to 10% of the olefinically unsaturated monomers are polyolefinically unsaturated.

10. A cationically depositable electrodeposition bath as claimed in claim 1, wherein at least 90% of polymer particles in the aqueous dispersion have diameters of between 5 and 500 nm.

11. A cationically depositable electrodeposition bath as claimed in claim 1, wherein the mass fraction of dispersed particles in the aqueous dispersion is between 10 and 60%.

12. A cationically depositable electrodeposition bath as claimed in claim 1, wherein dispersed particles in the dispersion are crosslinked and form a microgel.

13. A cationically depositable electrodeposition bath as claimed in claim 12, wherein the mass of the microgel is from 0.1 to 10% based on the mass of bath liquid.

14. A process for coating an electrically conductive substrate by an electrodeposition technique, comprising immersing the substrate in a bath liquid and connecting the substrate as a cathode, wherein the bath liquid includes 0.1 to 10% of an aqueous dispersion prepared by free-radically initiated emulsion polymerization, in water in the presence of a cationically stabilized polyurethane emulsifier of (i) one or more vinyl monomers and (ii) a molar proportion of from 0.001 to 15%, based on the sum of molar amounts of olefinically unsaturated monomers of one or more polyolefinically unsaturated monomers selected from the group consisting of divinyl benzene, butanediol diacrylate, glycol divinyl ether, divinyl adipate, allyl vinyl ether, triallyl cyanurate, and diallyl fumarate.

* * * * *